(12) United States Patent
Zhao et al.

(10) Patent No.: US 8,024,790 B2
(45) Date of Patent: Sep. 20, 2011

(54) PORTABLE SECURED COMPUTING ENVIRONMENT FOR PERFORMING ONLINE CONFIDENTIAL TRANSACTIONS IN UNTRUSTED COMPUTERS

(75) Inventors: Xiaoming Zhao, Nanjing (CN); Gang Chen, Nanjing (CN); Heather Xing, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1196 days.

(21) Appl. No.: 11/786,099

(22) Filed: Apr. 11, 2007

(65) Prior Publication Data
US 2008/0256536 A1 Oct. 16, 2008

(51) Int. Cl.
*G06F 21/00* (2006.01)
*H04L 29/06* (2006.01)

(52) U.S. Cl. ............... 726/17; 726/22; 726/26
(58) Field of Classification Search ........ 726/26; 713/1
See application file for complete search history.

(56) References Cited

U.S. PATENT DOCUMENTS

| 6,091,412 | A | 7/2000 | Simonoff et al. |
| 6,356,931 | B2 | 3/2002 | Ismael et al. |
| 6,401,134 | B1 | 6/2002 | Razavi et al. |
| 6,433,794 | B1 | 8/2002 | Beadle et al. |
| 6,492,995 | B1 | 12/2002 | Atkin et al. |
| 6,647,544 | B1 | 11/2003 | Ryman et al. |
| 6,757,895 | B1 | 6/2004 | Beadle et al. |
| 6,799,195 | B1 | 9/2004 | Thibault et al. |
| 6,842,777 | B1 | 1/2005 | Tuli |
| 6,842,897 | B1 | 1/2005 | Beadle et al. |
| 6,941,552 | B1 | 9/2005 | Beadle et al. |
| 6,976,059 | B1 | 12/2005 | Rogalski et al. |
| 7,039,691 | B1 | 5/2006 | Turnidge |
| 7,191,211 | B2 | 3/2007 | Tuli |
| 7,290,129 | B2 * | 10/2007 | Chebolu et al. ............ 713/150 |
| 7,506,257 | B1 * | 3/2009 | Chavez et al. ............ 715/714 |
| 7,634,811 | B1 * | 12/2009 | Kienzle et al. ............ 726/22 |
| 2001/0054062 | A1 | 12/2001 | Ismael et al. |
| 2002/0129281 | A1 | 9/2002 | Hatfalvi et al. |

(Continued)

FOREIGN PATENT DOCUMENTS
WO WO2005066786 7/2005

OTHER PUBLICATIONS

"U3 Bring the Power of Portable Software to Your USB Flash Drive—Make It a Smart Drive!", 2 sheets, 2005-2006, webpage [online] [retrieved on Mar. 26, 2007]. Retrieved from the internet: <http://www.u3.com/>.

(Continued)

*Primary Examiner* — Gilberto Barron, Jr.
*Assistant Examiner* — Devin Almeida
(74) *Attorney, Agent, or Firm* — Okamoto & Benedicto LLP

(57) ABSTRACT

A portable secured computing environment for performing online confidential transactions in an untrusted host computer. The secured computing environment may be loaded from a portable storage device, such as a USB stick, plugged into a peripheral port of the host computer. The secured computing environment may include a virtual machine running under a host operating system of the host computer. A secured operating system may be running in the virtual machine. An online application, such as a web browser in communication with an online service, may be run under the secured operating system. Operation of the online application may be restricted by a security profile. For example, the online application may only access network addresses specifically indicated in a whitelist of the security profile.

20 Claims, 8 Drawing Sheets

U.S. PATENT DOCUMENTS

| | | | |
|---|---|---|---|
| 2003/0041106 | A1 | 2/2003 | Tuli |
| 2004/0148608 | A1 | 7/2004 | Gendreau et al. |
| 2004/0158830 | A1 | 8/2004 | Chung et al. |
| 2004/0230643 | A1 | 11/2004 | Thibault et al. |
| 2005/0188361 | A1 | 8/2005 | Cai et al. |
| 2005/0198485 | A1* | 9/2005 | Nguyen et al. ............... 713/1 |
| 2005/0246176 | A1 | 11/2005 | Creamer et al. |
| 2006/0112342 | A1 | 5/2006 | Bantz et al. |
| 2007/0199058 | A1* | 8/2007 | Baumgart et al. ............ 726/9 |

OTHER PUBLICATIONS

"Creating Signed Remote Applications—Creating Applications with Mozilla", pp. 1-4, Chapter 12. Remote Applications, [retrieved on Mar. 26, 2007], Retrieved from the internet: <http://www.csie.ntu.edu.tw/~piap/docs/CreateMozApp/mozilla-chp-12-sect-6.html>.

VMware, from Wikipedia, the free encyclopedia, pp. 1-8, [retrieved on Mar. 26, 2007]. Retrieved from the internet: <http://en.wikipedia.org/wiki/VMware>.

VMware, White Papers—Virtualization Overview. 12 sheets, 2007. [online] [retrieved on Mar. 26, 2007]. Retrieved from the internet: <http://www.vmware.com/solutions/whitepapers.html>.

VMware, White Papers—Virtualization: Architectural Considerations And Other Evaluation Criteria. 15 sheets, 2007. [online][retrieved on Mar. 26, 2007]. Retrieved from the internet: <http://www.vmware.com/solutions/whitepapers.html>.

Virtual machine—Wikipedia, the free encyclopedia, pp. 1-8 [retrieved on Dec. 3, 2009], retrieved from the internet: http://en.wikipedia.org/wiki/Virtual_machine.

* cited by examiner

PORTABLE SECURED COMPUTING ENVIRONMENT FOR PERFORMING ONLINE CONFIDENTIAL TRANSACTIONS IN UNTRUSTED COMPUTERS

BACKGROUND OF THE INVENTION

1. Field of the Invention

The present invention relates generally to computer security, and more particularly but not exclusively to methods and apparatus for performing confidential transactions using untrusted computers.

2. Description of the Background Art

Various confidential transactions involving exchange of sensitive information may be performed over the Internet. Examples of these confidential transactions include online banking, credit card purchases, accessing confidential documents from an enterprise network, e-mail access, and so on. A user does not even have to perform online confidential transactions using his own computer. For example, a user can employ a U3 Smart™ USB flash drive to access the Internet using a web browser with his favorite bookmarks on another person's computer. Although a user can employ various protective measures, such as antivirus programs and the like, to secure his own computer, it is very difficult to secure other computers especially those that are shared by several people or publicly available. This forces some users to exclusively use their own computers to perform online confidential transactions, which is not an ideal solution as it does not take advantage of the mobility and instant access provided by computer networks, such as the Internet. While mobility is not much of an issue with regards to performing online confidential transactions, security remains a major problem.

SUMMARY

In one embodiment, a secured computing environment may be loaded from a portable storage device, such as a USB stick, plugged into a peripheral port of a host computer. The secured computing environment may include a virtual machine running under a host operating system of the host computer. A secured operating system may be running in the virtual machine. An online application, such as a web browser in communication with an online service, may be run under the secured operating system. Operation of the online application may be restricted by a security profile. For example, the online application may only access network addresses specifically indicated in a whitelist of the security profile.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
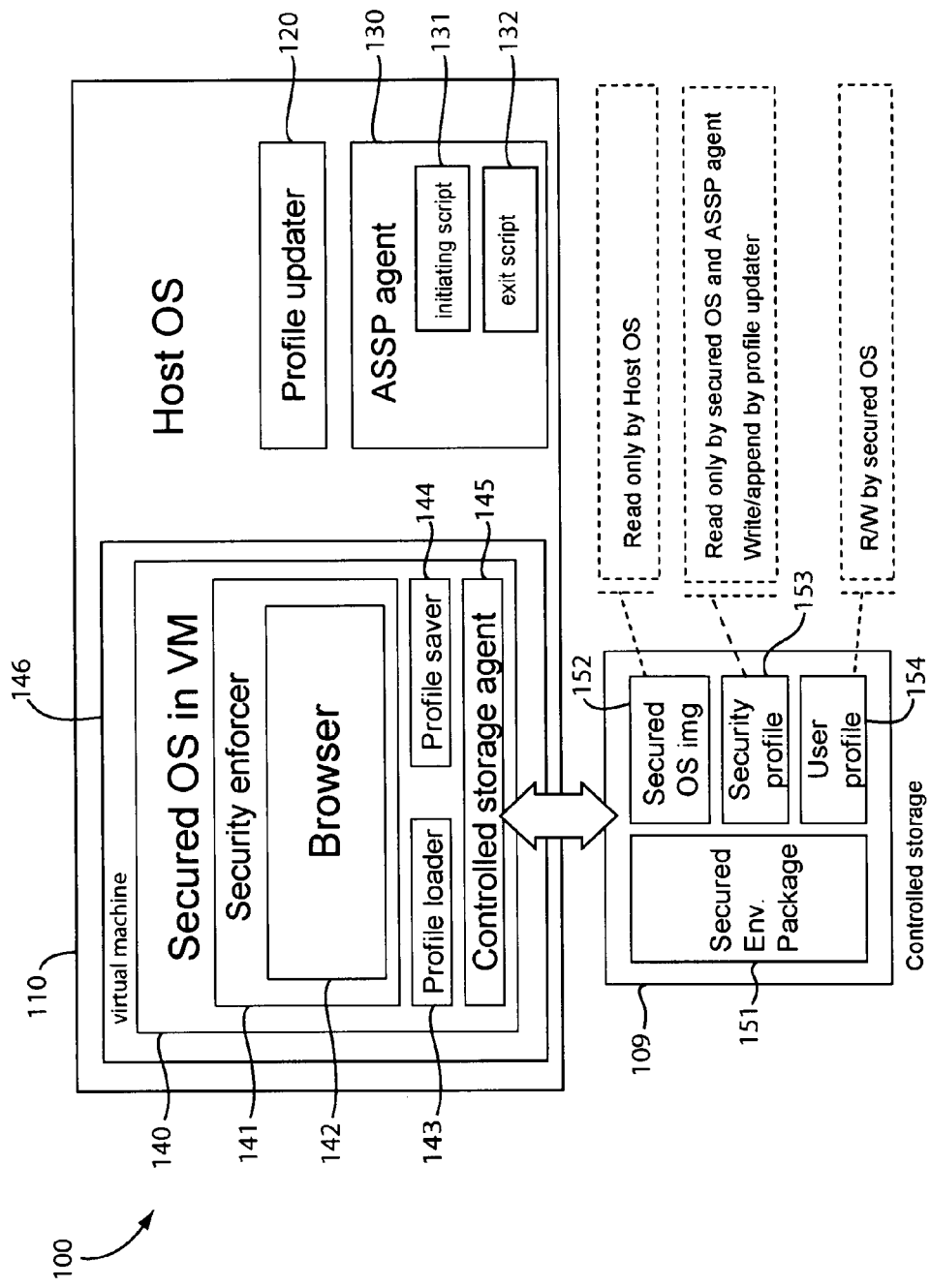
FIG. 1 schematically shows a secured computing environment in accordance with an embodiment of the present invention.

FIG. 1 schematically shows a secured computing environment 100 in accordance with an embodiment of the present invention. In the example of FIG. 1, an online application, such as web browser 142 configured to perform a confidential transaction with an online service, runs under a secured operating system 140 in a virtual machine (VM) 146. Virtual machines, in general, are well known. In a nutshell, a virtual machine comprises software that creates a virtualized environment between computer hardware platform and its operating system. The computer hardware platform is also referred to as the "host computer," while its host operating system is also referred to as the "host operating system." Because the virtual machine acts as a separate computing environment, the secured operating system may be different from the host operating system. In one embodiment, the host operating system 110 comprises the Microsoft Windows™ XP operating system and the secured operating system 140 running the in the virtual machine comprises Microsoft Windows™ XP Embedded operating system. Other operating systems may also be used without detracting from the merits of the present invention. The secured operating system 140 is secured in that it may be configured to include only those components needed to support the application, have a read-only image 152, and may include protection rules, such as firewall protection rules. The virtual machine 146 in which the secured operating system 140 operates may comprise commercially-available virtualization software, such as those from VMWare, Inc.

As shown in FIG. 1, there may be several computer-readable program codes running under the secured operating system, including the browser 142, a security enforcer 141, a profile loader 143, a profile saver 144, and a controlled storage agent 145. The enforcer 141 may comprise computer-readable program code for providing firewall functionalities and for enforcing one or more protection policies dictated by a security profile 153.

The profile loader 143 may comprise computer-readable program code for loading a security profile 153 from a controlled storage 109 to run under the secured operating system 140. The profile saver 144 may comprise computer-readable code for saving a security profile 153 and a user profile 154 to the controlled storage 109. The controlled storage agent 145 may comprise computer-readable program code to allow the secured operating system 110 to interface with the controlled storage 109. The host operating system 110 may interface with the controlled storage 109 using its own device drivers. As will be more apparent below, data access privileges to the controlled storage 109 may be strictly limited to particular instances and components to maintain the integrity of data in the controlled storage 109.

There may be several computer-readable program codes running under the host operating system 110, including a profile updater 120 and an application-specific secured platform (ASSP) agent 130. The profile updater 120 may comprise computer-readable program code for receiving updates of security profiles 153 from a security solutions vendor ("vendor") providing the secured computing environment 100. For example, the profile updater 120 may periodically poll a server of the vendor to receive new or updated security profiles 153. The profile updater 120 may write new security profiles 153 or append to existing security profiles 153 in the controlled storage 109. Each security profile 153 is preferably signed by the vendor to allow the security profile 153 to be authenticated by the profile loader 143 prior to use. For example, each security profile 153 may include embedded signature data that the profile loader 143 may look for and interpret to determine whether or not the security profile 153 is authentic and actually came from the security solutions vendor.

The ASSP agent 130 may comprise computer-readable program code for installing the virtual machine 146, launching the secure operating system 140 to run in the virtual machine 146, and to remove traces of the virtual machine 146 and secured operating system 140 in the host operating system 110 upon exit. The ASSP agent 130 may include an initiating script 131 for starting up the virtual machine 146 and the secured operating system 140, and an exit script 132 for performing cleanup after the virtual machine 146 and the secured operating system 140 are exited. The ASSP agent 130 may be configured to prompt the user to select a security profile 153 or automatically select a security profile 153 based on an event, such as the user navigating to a sensitive online location (e.g., sensitive website), for example.

In one embodiment, the enforcer 141, the browser 142, the profile loader 143, the profile saver 144, and the controlled storage agent 145 automatically starts up when the secured operating system 140 is launched.

The controlled storage 109 may comprise non-volatile memory configured to store a secured environment package 151, an image 152 of the secured operating system 140, one or more security profiles 153, and one or more user profiles 154. The secured environment package 151 may comprise computer-readable program codes and associated data components to install and execute the profile updater 120, the ASSP agent 130 (including the initiating script 131 and the exit script 132), the virtual machine 146, and the components shown in FIG. 1 as running in the virtual machine 146.

In one embodiment, to maintain data integrity, access to data stored in the controlled storage 109 may be restricted to particular applications and for particular purposes only. In the example of FIG. 1, the secured operating system image 152 may only be accessed by the host operating system 110 and only for reading (i.e., read-only). A security profile 153 may only be accessed by the ASSP agent 130, the secured operating system 140, and the profile updater 120. The ASSP agent 130 and the secured operating system 140 may only read a security profile 153, while the profile updater 120 may write a new security profile 153 or append to an existing security profile 153. A user a profile 154 may only be accessed by the secured operating system 140 for both reading and writing.

In one embodiment, a security profile 153 comprises data for running and controlling the operation of the browser 142 and for authenticating confidential transactions. For example, a security profile 153 may include a white list indicating network addresses (e.g., IP/domain name/URL) to which the browser 142 can only be pointed to, a default starting network address (e.g., a home page), and authentication data (e.g., trusted root certificates). A whitelist in the security profile 153 may include a listing of websites, and corresponding web pages, that the browser 142 may access; the browser 142 may not access network addresses not included in the whitelist. Preferably, each security profile 153 is tailored for a particular application. For example, one security profile 153 may be tailored for a particular online bank, another security profile 153 may be tailored for a particular email server account, and so on. Furthermore, this restricts the confidential transaction that may be performed by the user in the virtual machine 146, minimizing the possibility of a security breach. A security profile 153 is preferably signed by the security solutions vendor.

In one embodiment, a user profile 154 comprises user-specific data for running the browser 142, such as network settings (e.g., proxy), user certificates and private keys, downloaded ActiveX controls signed by publishers, downloaded cookies, stored passwords, etc. A user profile 154 is preferably encrypted.

Figure 2:
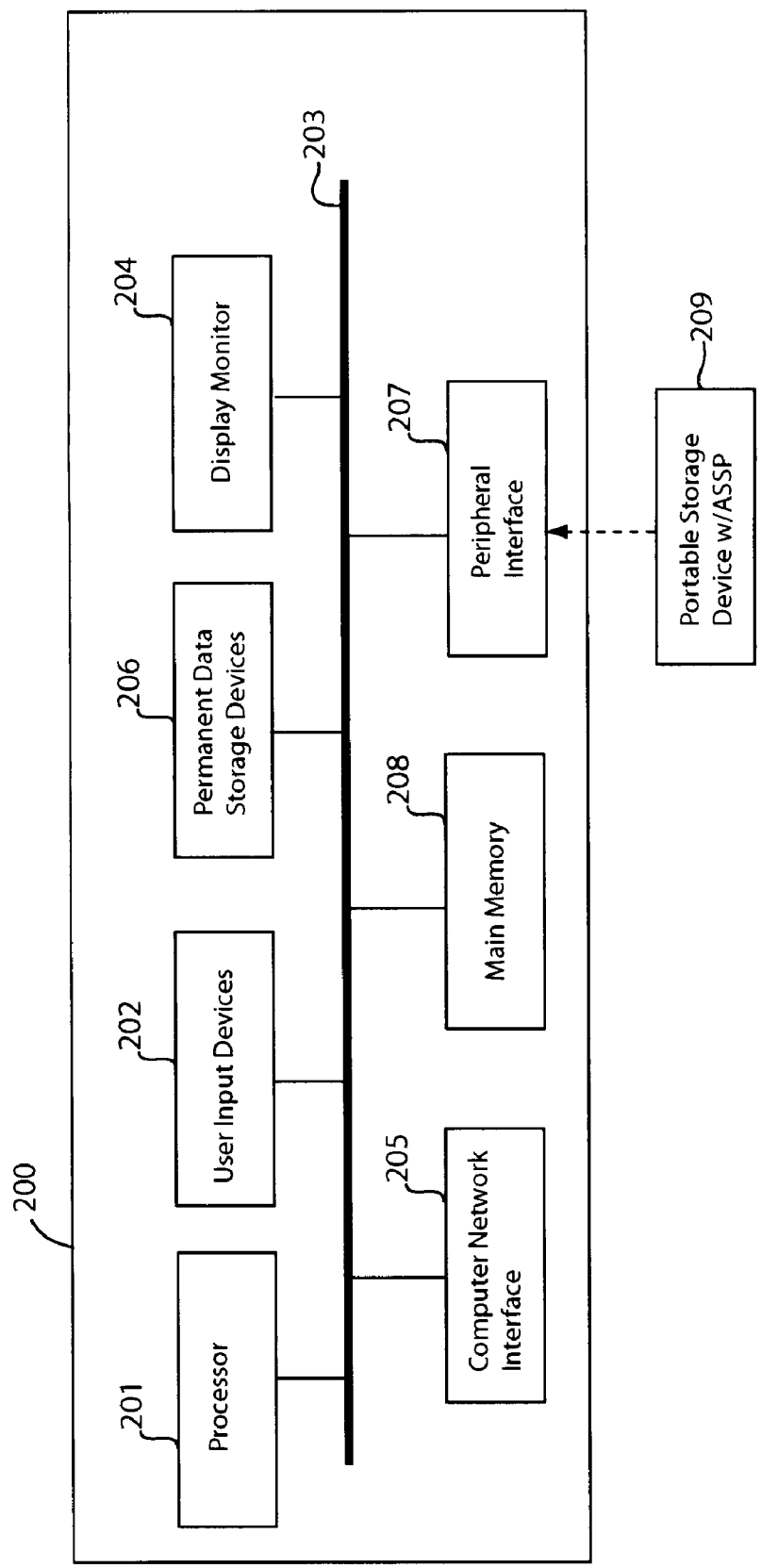
FIG. 2 shows a schematic diagram of a computer that may be used in embodiments of the present invention.

Referring now to FIG. 2, there is shown a schematic diagram of a computer 200 that may be used in embodiments of the present invention. The computer 200 may have less or more components to meet the needs of a particular application. The computer 200 may be an untrusted computer in that it may be a shared, borrowed, or publicly-accessible computer, for example. That is, the user has no information as to whether the computer 200 is secure enough for performing a confidential transaction. As will be more apparent below, the computer 200 may incorporate features of the secured computing environment 100 to allow a user to safely employ the computer 200 even when the computer 200 is untrusted or unsecured (i.e., does not have its own network security measures). In the example of FIG. 2, the user installs a portable storage device 209 into the computer 200 to allow the user to safely conduct online confidential transactions using the computer 200.

The computer 200 may include a processor 201, such as those from the Intel Corporation or Advanced Micro Devices, for example. The computer 200 may have one or more buses 203 coupling its various components. The computer 200 may include one or more user input devices 202 (e.g., keyboard, mouse), one or more permanent data storage devices 206 (e.g., hard drive, optical disk), a display monitor 204 (e.g., LCD, flat panel monitor, CRT), a computer network interface 205 (e.g., network adapter, modem), and a main memory 208 (e.g., RAM). The host operating system 110 and components running under it as shown in FIG. 1 may be running in the main memory 208.

In the example of FIG. 1, the computer 200 further includes a peripheral interface port 207 for installing removably pluggable devices. The peripheral interface port 207 may comprise an I/O port for external portable devices. In one embodiment, the peripheral interface port 207 comprises a USB (Universal Serial Bus) port, and the portable storage device 209 comprises a USB stick, which is also referred to as "USB memory." Software components of the portable storage device 209 may be loaded onto the memory 208 for execution by the processor 201.

Figure 3:
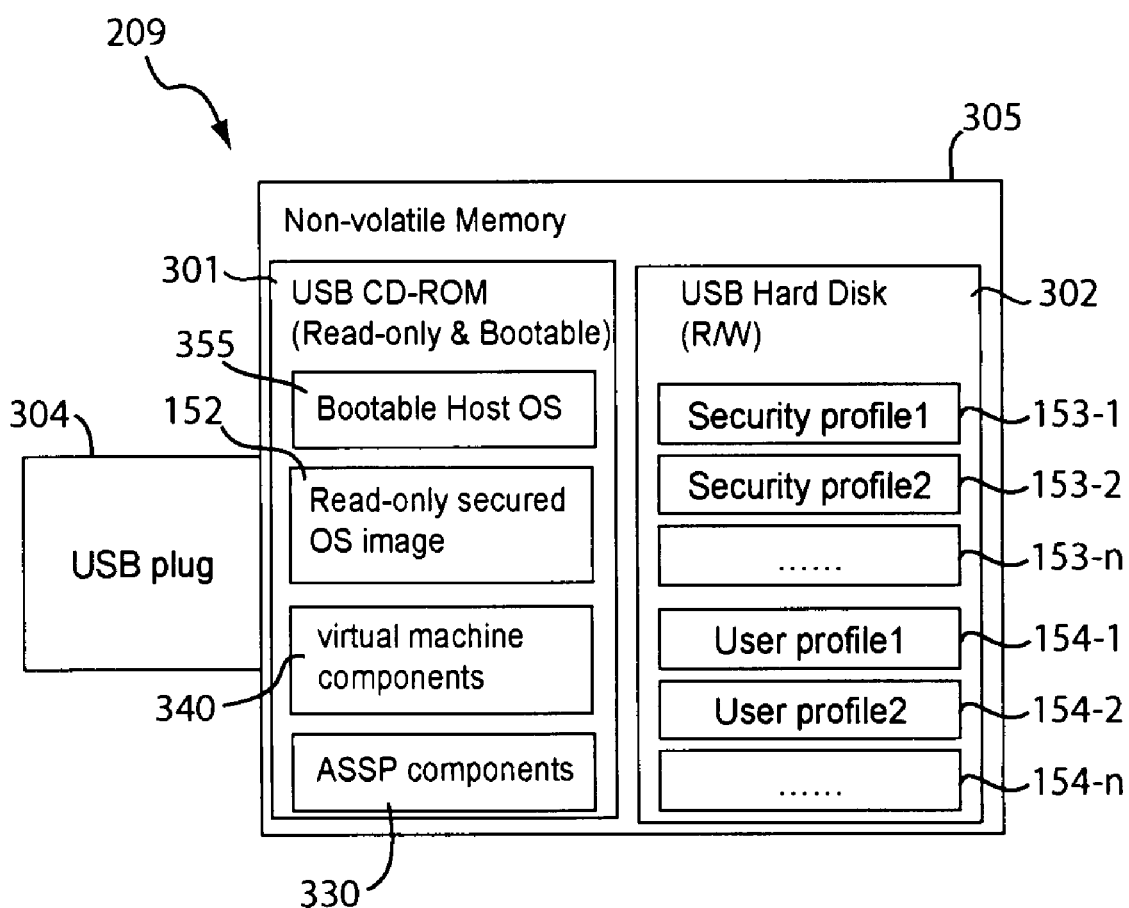
FIG. 3 schematically shows further details of a portable storage device in accordance with an embodiment of the present invention.

FIG. 3 schematically shows further details of the portable storage device 209 in accordance with an embodiment of the present invention. The security solutions vendor may sell the portable storage device 209 as a product for creating a portable secured computing environment.

In one embodiment, the portable storage device 209 comprises non-volatile memory 305, such as flash memory or a hard disk, and a plug end 304 for removably plugging into a peripheral interface port 207. The non-volatile memory 305 may include a CD-ROM partition 301 and a hard disk partition 302. The CD-ROM partition 301 may be configured to be bootable to allow the computer 200 to boot off the portable storage device 209. The CD-ROM partition 301 may also be configured to autorun to allow components of the portable storage device 209 to start up upon insertion into the computer 200.

As noted in FIG. 3, the CD-ROM partition 301 may be configured as read-only to prevent any application from tampering with its contents. The CD-ROM partition 301 may store a bootable host operating system 355 (e.g., Linux operating system), the secured operating system image 152 of the secured operating system 140, virtual machine components 340, and ASSP components 330. The security enforcer 141, the web browser 142, the profile loader 143, the profile saver 144, and the controlled storage agent 145 may be preinstalled in the secured operating system image 152. The virtual machine components 340 may comprise computer-readable program codes for installing the virtual machine 146. The virtual machine components 340 may include those typically provided by the manufacturer of the virtual machine 146. The ASSP components 330 may comprise computer-readable program codes for creating a secured computing environment including the profile updater 120 and the ASSP agent 130 (including the initiating script 131 and the exit script 132).

The hard disk partition 302 may comprise readable and writable portions of the non-volatile memory 305. In the example of FIG. 3, the hard disk partition 302 may comprise one or more security profiles 153 (i.e., 153-1, 153-2, . . . 153-n) and one or more user profiles 154 (i.e., 154-1, 154-2, . . . 154-n). Writing and reading to security profiles 153 and user profiles 154 are limited to particular components as previously explained with reference to FIG. 1. As previously noted, the security profiles 153 and the user profiles 154 are preferably encrypted to prevent unauthorized tampering and reading.

Figure 4:
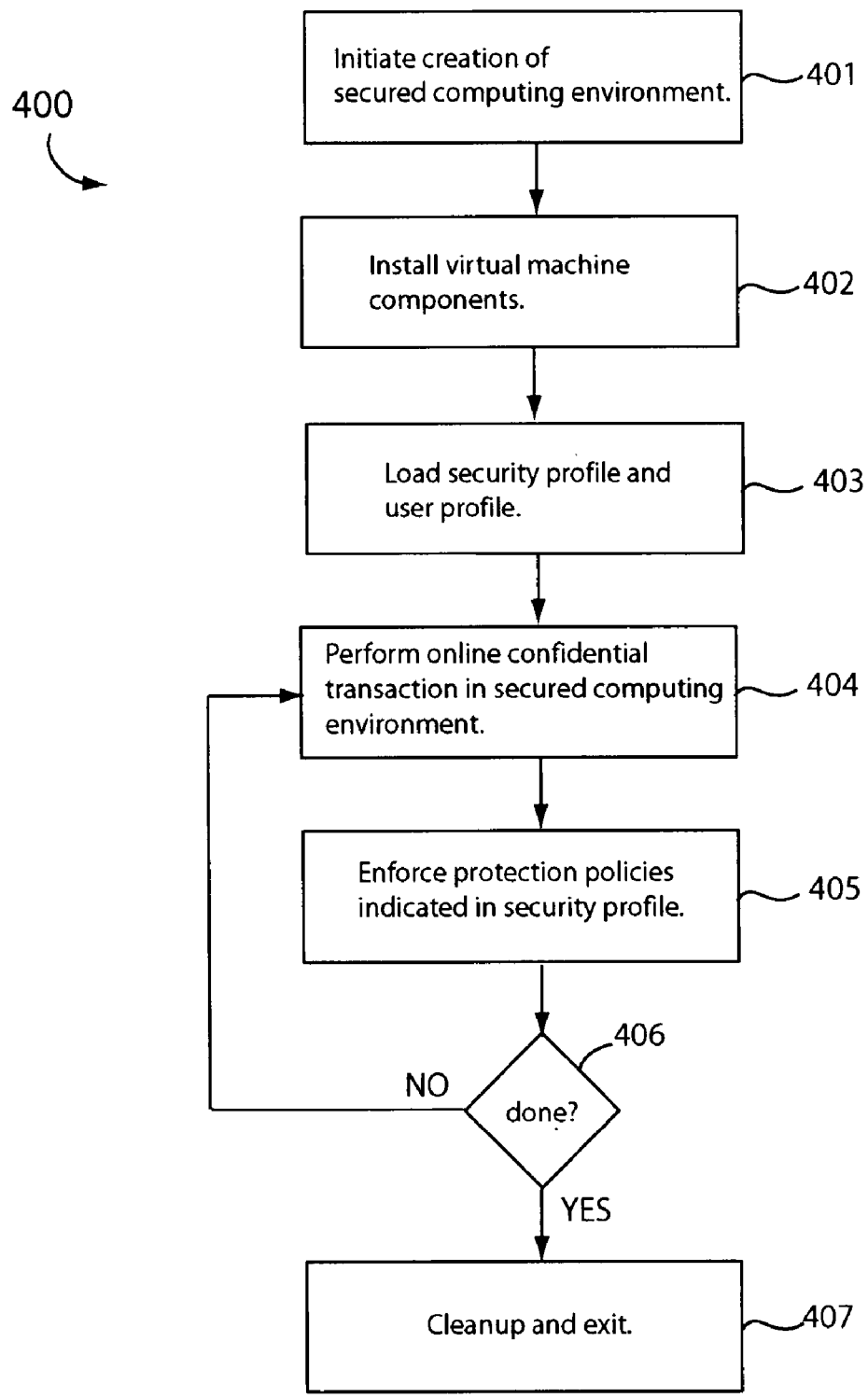
FIG. 4 shows a flow diagram of a method of providing a secured computing environment in accordance with an embodiment of the present invention.

FIG. 4 shows a flow diagram of a method 400 of providing a secured computing environment in accordance with an embodiment of the present invention. The method 400 is explained using the components of the secured computing environment 100 as an example. Other components may also be used without detracting from the merits of the present invention.

In step 401, creation of a secured computing environment is initiated. Initiating creation of the secured computing environment may involve running the initiating script 131 to start up the rest of the ASSP agent 130 and the profile updater 120.

In step 402, the initiating script 131 may install the virtual machine 146 and start the secured operating system 140 to run in the virtual machine 146. The security enforcer 141, the browser 142, the profile loader 143, the profile saver 144, and the controlled storage agent 145 may comprise start up programs of the secured operating system 140 and may thus automatically run upon start up of the secured operating system 140.

In step 403, a security profile 153 and a user profile 154 are loaded into the virtual machine 146. The security profile 153 may be manually selected by the user upon prompting by the ASSP agent 130 or automatically selected by the ASSP agent 130 based on the online confidential transaction the user is trying to perform. For example, a security profile 153 for a corresponding online service may automatically be selected when the user navigates to the website of that online service. It is to be noted that selection of a security profile may also occur before the launching of the virtual machine 146.

The profile loader 143 may authenticate the selected security profile 153 to ensure it came from the security solutions vendor and has not been tampered. The profile loader 143 may then load the selected security profile 153 from the controlled storage 109 to be accessible under the secured operating system 140. The profile loader 143 may also load a corresponding user profile 154 that specifies user-preferences and settings, such as network connection settings, user cookies, user certificates, stored passwords, and the like. The profile loader 143 may automatically select a user profile 154 that corresponds to the selected security profile 153. The profile loader 143 may also prompt the user to select a user profile 154 in situations where there are more than one user profiles 154 for the selected security profile 153.

In step 404, the user may perform an online confidential transaction in the secured computing environment 100. For example, the user may access the website of an online service indicated in the loaded security profile 153 using the browser 142. The user may safely exchange sensitive information, such as credit card information, passwords, account information, and the like, with the online service using the browser 142 because of features provided by the secured computing environment 100. Firstly, contents of the controlled storage 109 cannot be easily tampered because access to them are controlled by encryption, limited read/write privileges either by partition (read-only storage locations) or access privileges, or both. Secondly, the security profile 153 restricts network access only to those online locations indicated in its white list. This prevents XSS (cross-site scripting) attacks, network service or web based buffer overflow attacks, and similar network security threats. Thirdly, only certain applications can run in the secured operating system 140. In the example of FIG. 1, only the browser 142 in accordance with a security profile 153 can run in the secured operating system. Fourthly, vendor signed security profiles 153 dictate a default starting online location (home page URL) and include authentication information, such as trusted root certificates.

In step 405, the security enforcer 141 enforces one or more protection policies indicated in the loaded security profile 153, such as the white list of network addresses to which the browser 142 may only go to. For example, the security enforcer 141 may monitor the network address (e.g., URL) the browser 142 is pointed to and disable the browser 142 when the network address is not in the white list of the loaded security profile 153. As another example, the security enforcer 141 may monitor network communications to and from the browser 142 and intercept those communications having a network destination or source address not included in the white list. Other protection policies may include limiting the processes or modules allowed to run under the secured operating system 140, a list of URLs where the user must employ a software keyboard to input account parameters or passwords to get around keyloggers, etc.

The user may continue the online confidential transaction with the security enforcer 141 enforcing the protection policies until the user is done with the transaction, as indicated in the path from step 406 to step 404.

In step 407, the exit script 132 performs a cleanup when the user is done with the online confidential transaction. For example, the exit script 132 may automatically look for and remove traces, if any, of the virtual machine 146 from the computer upon detection that the virtual machine 146 has exited. This may occur when the user manually shuts down the virtual machine 146 along with components running in it.

Figure 5:
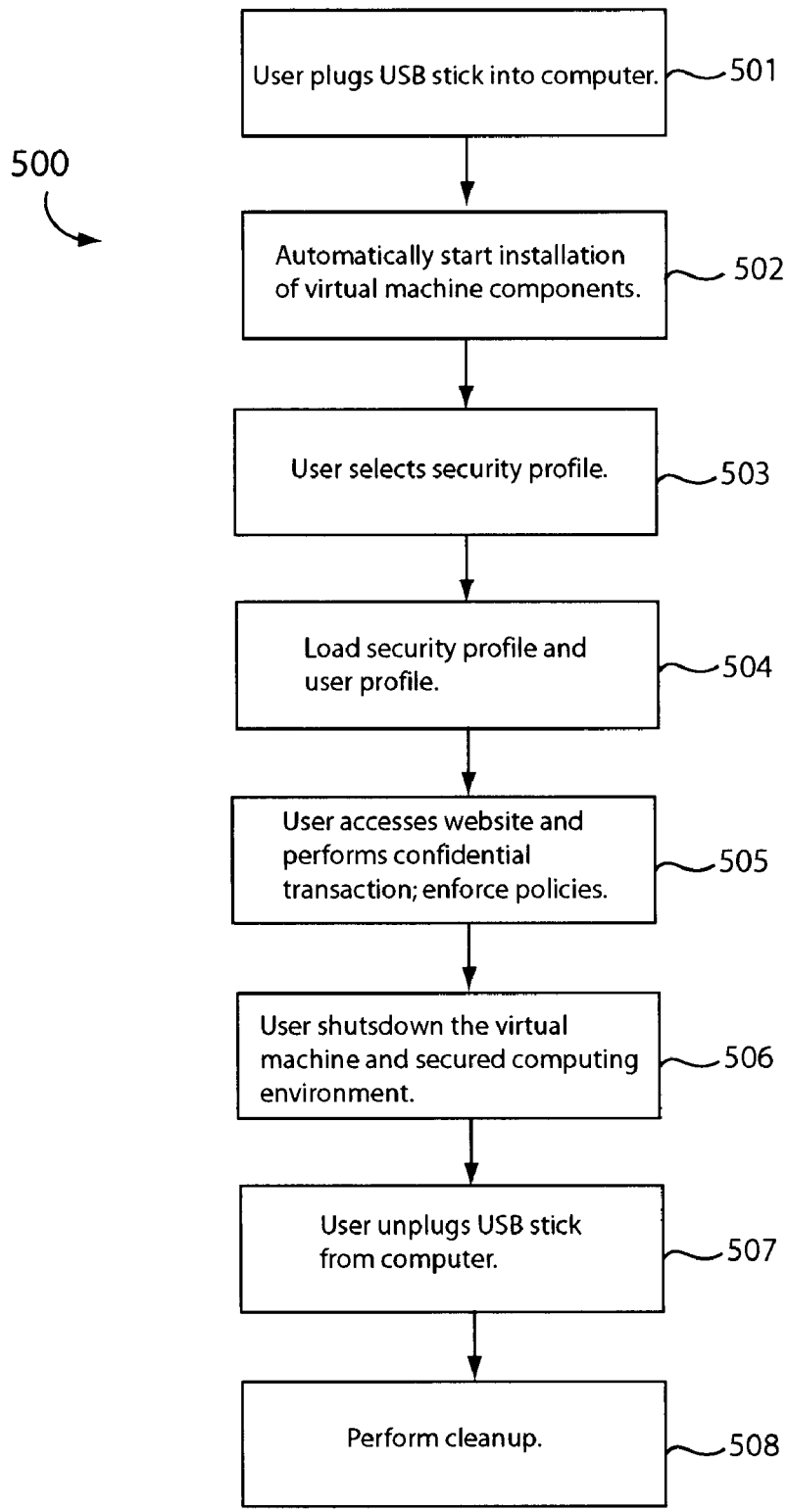
FIGS. 5-7 show flow diagrams of methods of providing a secured computing environment in accordance with embodiments of the present invention.

FIG. 5 shows a flow diagram of a method 500 of providing a secured computing environment in accordance with an embodiment of the present invention. The method 500 is explained using the components shown in FIGS. 1, 2, and 3 as an example. Other components may also be used without detracting from the merits of the present invention. The method 500 may be advantageously employed to perform an online confidential transaction using an untrusted computer 200. For example, the user may want to access an online account using a public, shared, or unfamiliar computer 200, such as those computers available in libraries, coffee shops, friend's house, another person's office, etc. In that case, the user may carry with him a portable storage device 209 to create a secured computing environment in the untrusted computer 200.

In step 501, the user plugs the portable storage device 209 in the computer 200. The portable storage device 209 comprises a USB stick in this example (see FIG. 3).

In step 502, the autorun feature of the host operating system running in the computer 200 automatically starts the initiating script 131, which is part of the ASSP components 330 in the CD-ROM partition 301 of the USB stick. The initiating script 131 starts up the rest of the ASSP agent 130 and the profile updater 120. The initiating script 131 also installs the virtual machine 146 and starts the secured operating system 140 to run in the virtual machine 146. The security enforcer 141, the browser 142, the profile loader 143, the profile saver 144, and the controlled storage agent 145 may comprise start up programs of the secured operating system 140 and may thus automatically run upon start up of the secured operating system 140.

In step 503, the ASSP agent 130 prompts the user to select a security profile 153. The profile loader 143 authenticates the security profile 153 selected by the user to ensure it came from the security solutions vendor and has not been tampered.

In step 504, assuming the selected security profile 153 is authentic, the profile loader 143 loads the selected security profile 153 from the USB stick. The profile loader 143 also loads a corresponding user profile 154 that specifies user-preferences and settings from the USB stick.

In step 505, the user accesses the website of an online service indicated in the loaded security profile 153 using the browser 142. The user may safely exchange sensitive information with the online service using the browser 142 to perform a confidential transaction, such as online banking, money transfer, or e-mail access, for example. The security enforcer 141 enforces one or more security policies dictated in the loaded security profile 153 while the user employs the browser 142.

In step 506, the user shuts down the virtual machine 146, and thus the components of the secured computing environment running in the virtual machine 146, upon completion of the online confidential transaction.

In step 507, the user unplugs the USB stick from the computer 200.

In step 508, the exit script 132 performs a cleanup and removes traces, if any, of the virtual machine 146 from the computer 200 upon detection that the USB stick has been unplugged.

Figure 6:
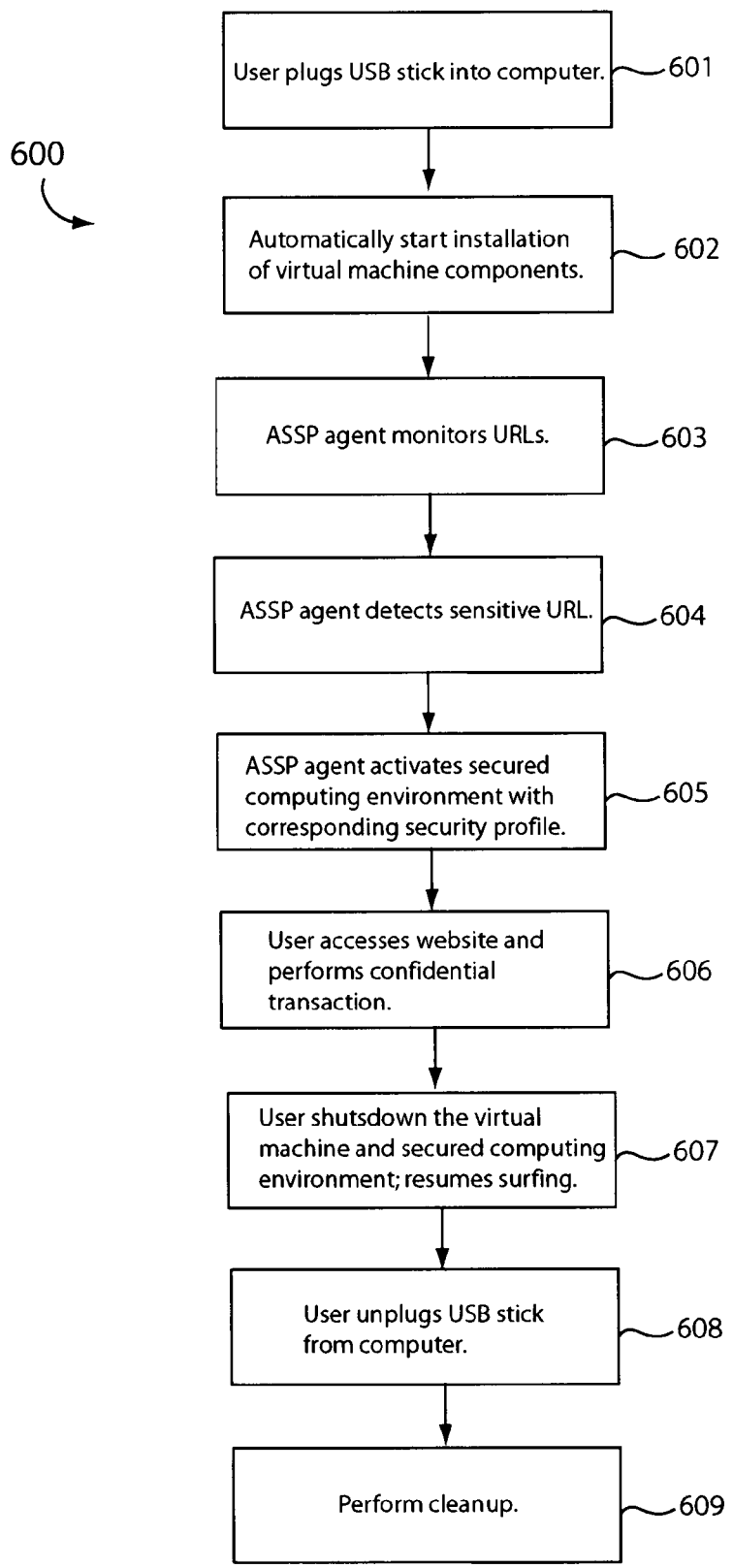

FIG. 6 shows a flow diagram of a method 600 of providing a secured computing environment in accordance with an embodiment of the present invention. The method 600 is explained using the components shown in FIGS. 1, 2, and 3 as an example. Other components may also be used without detracting from the merits of the present invention. The method 600 may be advantageously employed to perform an online confidential transaction using an untrusted computer 200. The method 600 pertains to automatically providing a secured computing environment to the user when the user tries to perform an online confidential transaction in the computer 200.

In step 601, the user plugs the portable storage device 209 in the computer 200. The portable storage device 209 comprises a USB stick in this example.

In step 602, the autorun feature of the host operating system running in the computer 200 automatically starts the initiating script 131, which is part of the ASSP components 330 in the CD-ROM partition 301 of the USB stick. The initiating script 131 starts up the rest of the ASSP agent 130 and the profile updater 120. The initiating script 131 also installs the virtual machine 146 and starts the secured operating system 140 to run in the virtual machine 146. The security enforcer 141, the browser 142, the profile loader 143, the profile saver 144, and the controlled storage agent 145 may comprise start up programs of the secured operating system 140 and may thus automatically run upon start up of the secured operating system 140.

In step 603, the ASSP agent 130 monitors the network addresses, which are uniform resource locators (URL's) in this example, accessed by the user using a web browser running directly under the host operating system 110. That is, the aforementioned web browser is not running in the virtual machine 146.

In step 604, the ASSP agent 130 detects that the user is trying to access a sensitive URL. In this example, a sensitive URL is a network address of an online service with which the user may perform a confidential transaction. The sensitive URL may be identified by the ASSP agent 130 by reading the whitelists of the security profiles 153 in the controlled storage agent 109; URLs indicated in the whitelists may be deemed as sensitive URLs.

In step 605, in response to detecting the sensitive URL, the ASSP agent 130 activates the secured computing environment to allow the user to use the browser 142 with a security profile 153 that corresponds to the sensitive URL. The profile loader 143 authenticates the security profile 153 selected by the ASSP agent 130 and, assuming the selected security profile 153 is authentic, loads the selected security profile 153 from the USB stick. The profile loader 143 also loads a corresponding user profile 154 that specifies user-preferences and settings from the USB stick.

In step 606, the user access the website of an online service indicated in the loaded security profile 153 using the browser 142. The user may safely exchange sensitive information with the online service using the browser 142 to perform a confidential transaction. The security enforcer 141 enforces one or more security policies dictated in the loaded security profile 153 while the user employs the browser 142.

In step 607, the user shuts down the virtual machine 146, and thus the components of the secured computing environment running in the virtual machine 146, upon completion of the online confidential transaction. The user may resume surfing the web using a browser running directly under the host operating system 110. The agent 130 may continue monitoring the network addresses accessed in the computer 200, and start up the secured computing environment upon detection of a sensitive URL.

In step 608, the user unplugs the USB stick from the computer 200.

In step 609, the exit script 132 performs a cleanup and removes traces, if any, of the virtual machine 146 from the computer 200 upon detection that the USB stick has been unplugged.

Figure 7:
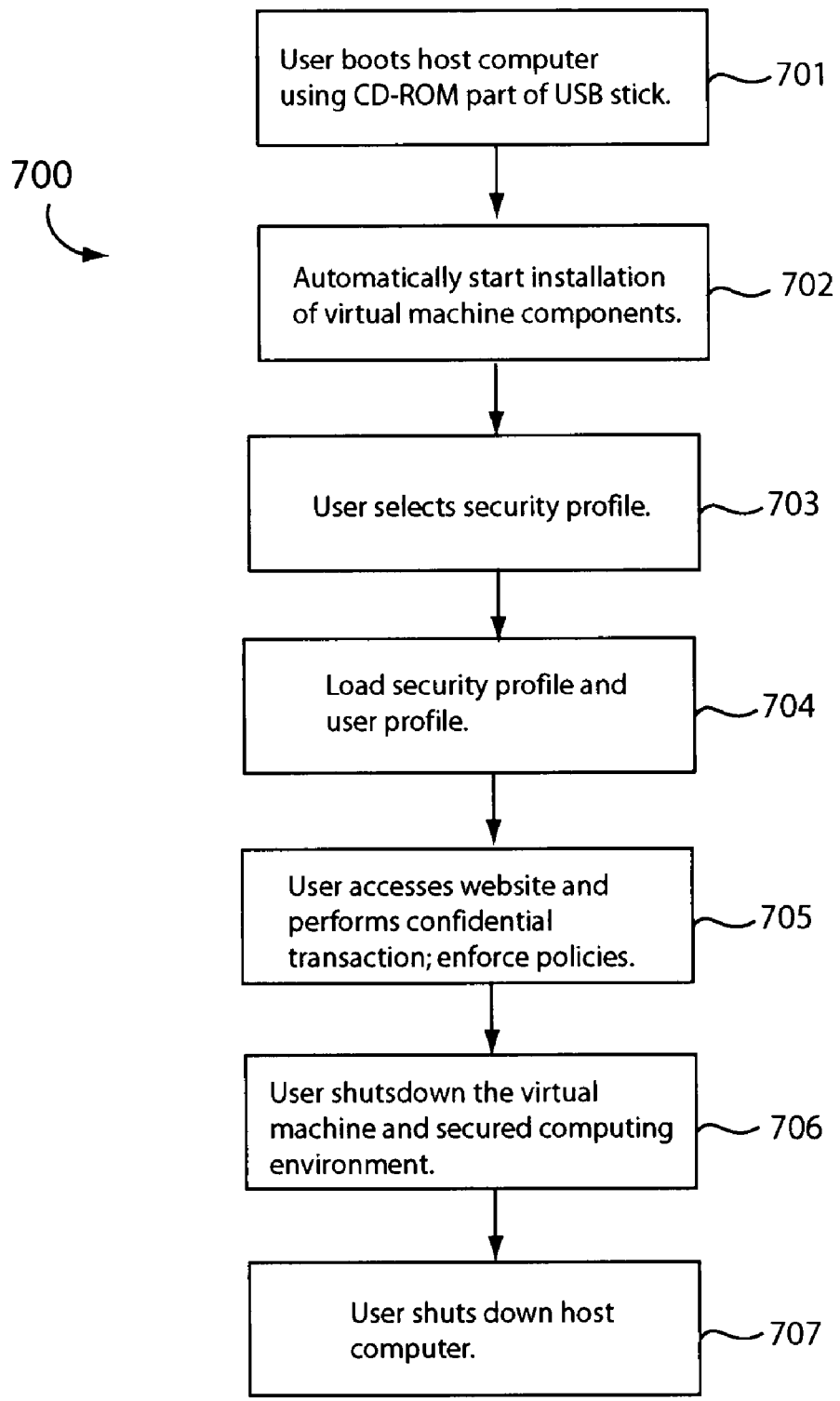

FIG. 7 shows a flow diagram of a method 700 of providing a secured computing environment in accordance with an embodiment of the present invention. The method 700 is explained using the components shown in FIGS. 1, 2, and 3 as an example. Other components may also be used without detracting from the merits of the present invention. The method 700 may be advantageously employed to perform an online confidential transaction using an untrusted computer 200. The method 600 pertains to creating a secured computing environment by booting off the portable storage device 209.

In step 701, the user boots the computer 200 using the portable storage device 209, which comprises a USB stick in this example. For example, the user may boot off the USB stick using the bootable CD-ROM partition 301. In this example, the user boots the host operating system 355 under which the virtual machine 146 is run.

In step 702, the autorun feature of the host operating system starts the initiating script 131, which is part of the ASSP components 330 in the CD-ROM partition 301 of the USB stick. The initiating script 131 starts up the rest of the ASSP agent 130 and the profile updater 120. The initiating script 131 also installs the virtual machine 146 and starts the secured operating system 140 to run in the virtual machine 146. The security enforcer 141, the browser 142, the profile loader 143, the profile saver 144, and the controlled storage agent 145 may comprise start up programs of the secured operating system 140 and may thus automatically run upon start up of the secured operating system 140.

In step 703, the ASSP agent 130 prompts the user to select a security profile 153. The profile loader 143 authenticates the security profile 153 selected by the user to ensure it came from the security solutions vendor and has not been tampered.

In step 704, assuming the selected security profile 153 is authentic, the profile loader 143 loads the selected security profile 153 from the USB stick. The profile loader 143 also loads a corresponding user profile 154 that specifies user-preferences and settings from the USB stick.

In step 705, the user accesses the website of an online service indicated in the loaded security profile 153 using the browser 142. The user may safely exchange sensitive information with the online service using the browser 142 to perform a confidential transaction, such as online banking, money transfer, or e-mail access, for example. The security enforcer 141 enforces one or more security policies dictated in the loaded security profile 153 while the user employs the browser 142.

In step 706, the user shuts down the virtual machine 146, and thus the components of the secured computing environment running in the virtual machine 146, upon completion of the online confidential transaction.

In step 707, the user shuts down the computer 200.

It is to be noted that while the above-described embodiments involve running a single application, which is an online confidential transaction using a web browser in the examples, the invention also allows for running several different applications, each with its own security profile. In that case, the different applications are preferably run in the same virtual machine under the same secured operating system to save disk space. The differences between the applications may be taken into account in their particular security and user profiles.

As can be appreciated from the foregoing, embodiments of the present invention provide advantages heretofore unrealized. For one, the present invention provides a portable secured computing environment that may be created even in computers whose security status is unknown. This allows users to safely perform online confidential transactions using untrusted computers. Furthermore, the present invention allows for creating a secured computing environment in a virtual machine while saving disk space.

Figure 8:
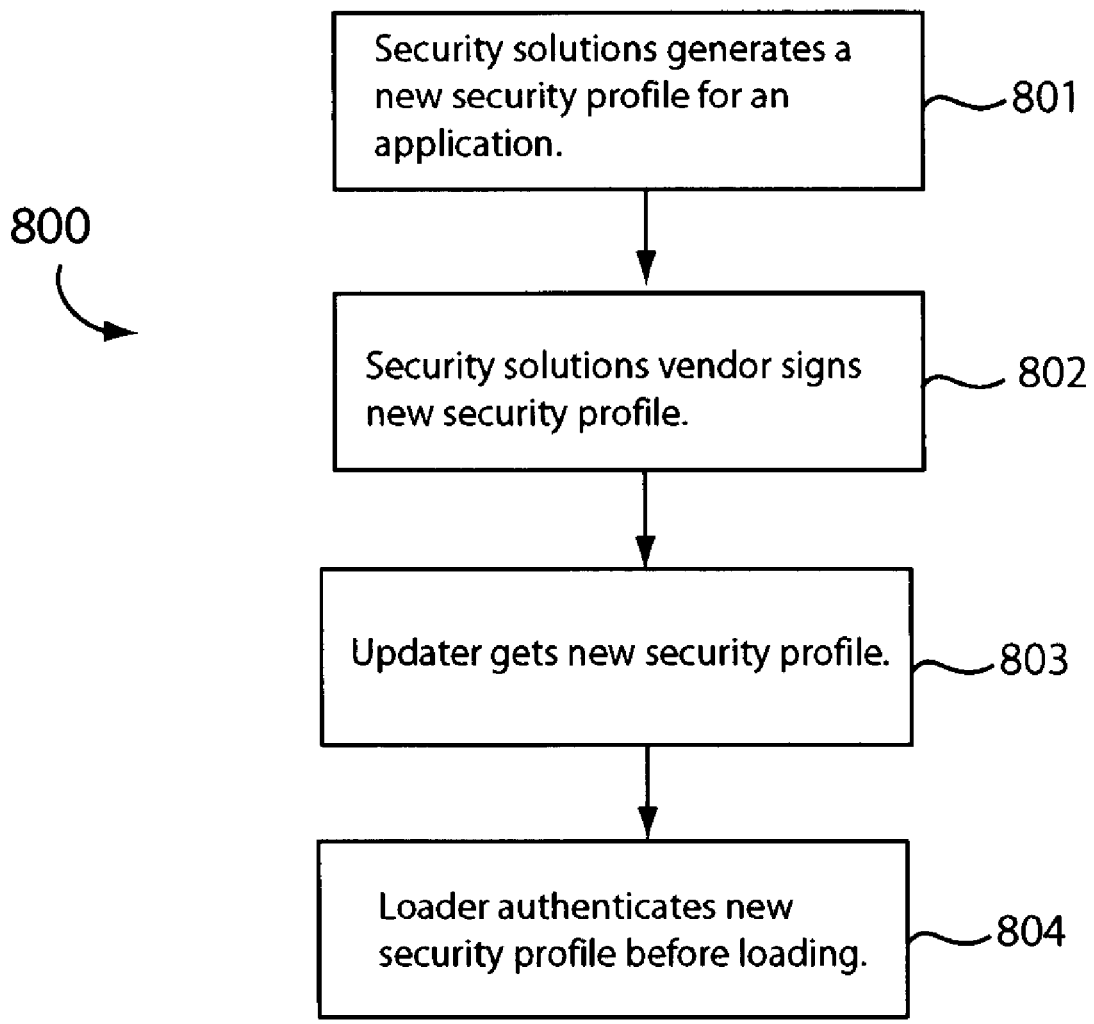
FIG. 8 shows a method of providing a new security profile in accordance with an embodiment of the present invention.

As previously noted, the security solutions vendor may provide different security profiles 153 for different confidential online transactions or other applications. FIG. 8 shows a method 800 of providing a new security profile 153 in accordance with an embodiment of the present invention. The method 800 is explained using the components of FIG. 1 as an example. Other components may also be used without detracting from the merits of the present invention.

In step 801, the security solutions vendor generates a new security profile 153 for an application. The new security profile 153 may be an entirely new security profile 153 or an update to a pre-existing security profile 153.

In step 802, the security solutions vendor signs the new security profile 153. For example, the security solutions vendor may embed signature data in the new security profile 153.

In step 803, the profile updater 120 receives the new security profile 153. For example, the profile updater 120 may be configured to periodically poll a server of the security solutions vendor, and download the new security profile 153 if available.

In step 804, the profile loader 143 verifies the authenticity of the new security profile 153 prior to loading into the virtual machine 146. For example, the profile loader 143 may check the signature of the new security profile 153 prior to loading.

Portable secured computing environments for performing online confidential transactions in untrusted computers have been disclosed. While specific embodiments of the present invention have been provided, it is to be understood that these embodiments are for illustration purposes and not limiting. For example, the steps of the disclosed methods may be performed in different orders without detracting from the merits of the present invention. Many additional embodiments will be apparent to persons of ordinary skill in the art reading this disclosure.

What is claimed is:

1. A method of providing a secured computing environment in a computer, the method comprising:

installing a virtual machine to run under a host operating system of a host computer, the virtual machine being loaded from a USB stick that has been plugged into a port of the host computer;

loading a secured operating system from the USB stick to run in the virtual machine;

prompting a user of the host computer to select a security profile;

loading the security profile from the USB stick to run in the virtual machine;

loading a web browser from the USB stick into the virtual machine to run under the secured operating system to allow the user to access a website to perform an online confidential transaction, the website being indicated in a whitelist of the security profile, the security profile being generated and signed by a security solutions vendor providing the USB stick; and restricting navigation of the web browser only to network addresses indicated in the whitelist.

2. The method of claim 1 further comprising:

removing traces of the virtual machine in the host computer when the user unplugs the USB stick from the host computer.

3. The method of claim 1 wherein the USB stick comprises non-volatile memory with a CD-ROM partition and a hard disk partition, and wherein components of the virtual machine are stored in the CD-ROM partition.

4. The method of claim 1 wherein the USB stick comprises non-volatile memory with a CD-ROM partition and a hard disk partition, and wherein the security profile has been loaded from the hard disk partition.

5. The method of claim 1 wherein the security profile is checked for authenticity prior to being loaded to run in the virtual machine.

6. The method of claim 5 wherein the security profile is checked for signature data from the security solutions vendor.

7. The method of claim 1 wherein the security profile is encrypted.

8. The method of claim 1 wherein the online confidential transaction involves transfer of credit card information from the host computer to the website.

9. The method of claim 1 further comprising loading a user profile to run in the virtual machine, the user profile including user-specific network connection settings.

10. The method of claim 1 wherein the virtual machine is automatically installed using the autorun feature of the host operating system in response to the user plugging the USB stick into the host computer.

11. A portable storage device pluggable into a port of a host computer, the portable storage device comprising:

a plug for removably plugging into the port of the host computer;

a read-only partition comprising computer-readable program codes for installing a virtual machine to run under a host operating system of the host computer, for installing another operating system to run in the virtual machine, and for installing a first web browser for accessing websites on the Internet to run under the other operating system, and for detecting that a uniform resource locator (URL) accessed by a second web browser running in the host operating system to be a sensitive URL and using the first web browser to initiate connection to a sensitive website addressed by the URL in response to detecting that the URL is a sensitive URL; and a read/write partition comprising a security profile that limits the network locations accessible from the other operating system.

12. The portable storage device of claim 11 wherein the read-only partition comprises a bootable CD-ROM partition.

13. The portable storage device of claim 11 wherein the plug comprises a USB plug.

14. The portable storage device of claim 11 wherein the read/write partition comprises a hard disk partition.

15. The portable storage device of claim 11 wherein the read-only partition and the read/write partition are in non-volatile memory comprising flash memory.

16. A method of providing a secured computing environment in a computer, the method comprising:

installing a virtual machine to run under a host operating system of a host computer;

running another operating system to run in the virtual machine;

running an online application under the other operating system;

detecting that a uniform resource locator (URL) accessed using a first web browser running under the host operating system is a sensitive URL;

in response to detecting that the URL accessed using the first web browser is a sensitive URL, initiating connection to an online service having the sensitive URL by way of the online application; and restricting operation of the online application in accordance with a security profile.

17. The method of claim 16 wherein the online application comprises a second web browser running under the other operating system in the virtual machine.

18. The method of claim 17 wherein the user is prompted to select the security profile.

19. The method of claim 16 wherein the security profile prohibits network access to network locations other those listed in a whitelist included in the security profile.

20. The method of claim 16 wherein the virtual machine and the other operating system are loaded from a USB stick plugged into a peripheral port of the host computer.

* * * * *